May 1, 1962 L. JOLLEY 3,032,065
PNEUMATIC CYLINDER CONTROL
Filed Sept. 9, 1959 2 Sheets-Sheet 1

INVENTOR.
LEONARD JOLLEY
BY
Gardner & Zimmerman
ATTORNEYS

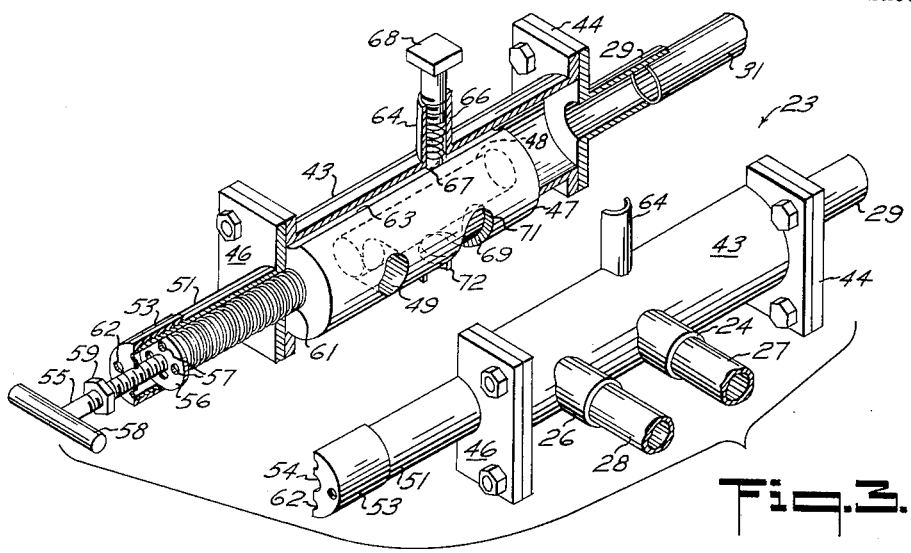
Fig.3.
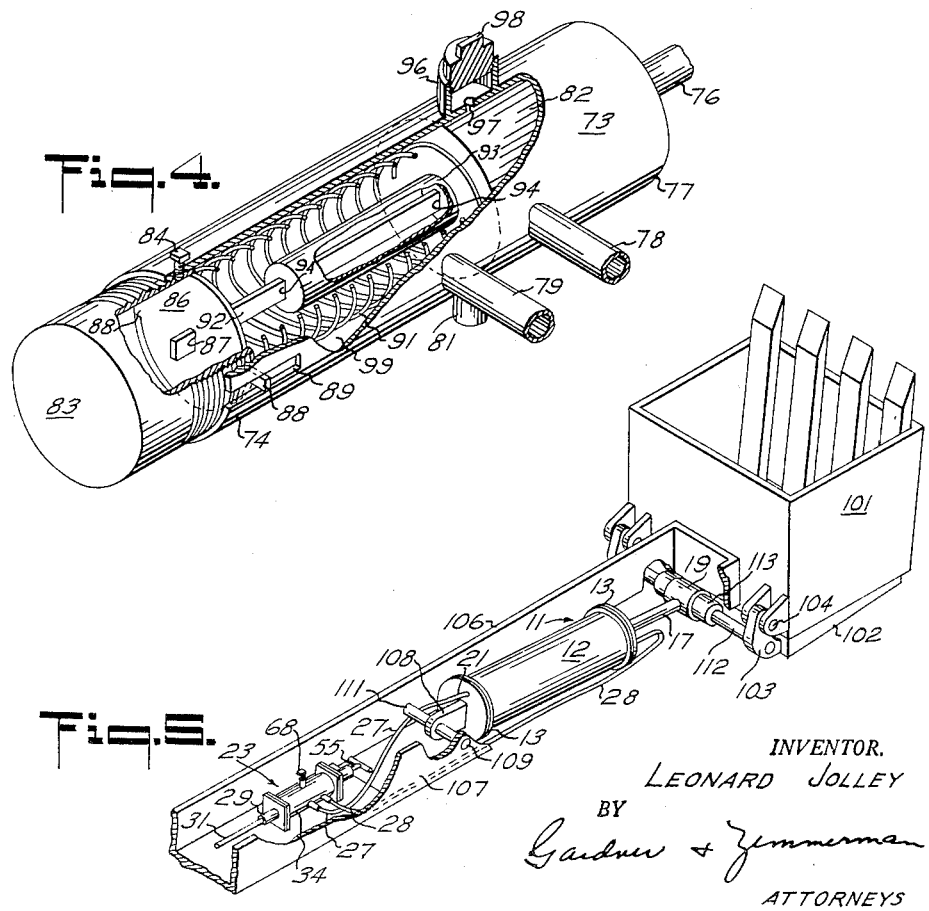
Fig.4.
Fig.5.
INVENTOR.
LEONARD JOLLEY
BY
Gardner & Zimmerman
ATTORNEYS United States Patent Office 3,032,065
Patented May 1, 1962

3,032,065
PNEUMATIC CYLINDER CONTROL
Leonard Jolley, 805 E. 20th, The Dalles, Oreg.
Filed Sept. 9, 1959, Ser. No. 838,997
11 Claims. (Cl. 137—622)

The present invention relates to fluid pressure driven mechanisms and more particularly to a control element particularly adapted to operate a double acting pneumatic cylinder by means of pressure variations in a single supply hose.

A very common form of power drive means, for producing controlled reciprocating motion of a shaft, is the double acting pneumatic cylinder. Briefly, such mechanism comprises a long cylinder having a slidable piston therein and having a shaft extending axially from one side of the piston and through a port at one end of the cylinder. The admission of compressed air to either end of the cylinder acts to drive the piston, and thus the shaft, towards the opposite end of the cylinder. To provide for manual control of the action of the cylinder an operator's valve is frequently provided by means of which valve an operator may connect compressed air from a suitable supply to either of two hoses leading to the two ends of the cylinder.

There are possible uses for the pneumatic cylinder, however, where circumstances make it necessary that the operator be situated a considerable distance from the air cylinder. An example of this condition, and an application for which the present invention is particularly advantageous, is the adaptation of a pneumatic cylinder to opening and closing the hinged bottom on the bucket of a power shovel. In this application, the pneumatic cylinder must be situated near the extremity of a pivoting dipper stick whereas the operator is located in a remote cab. In this usage, as in many other applications of pneumatic cylinders, the requirement that two separate hoses extend from the operator's valve to the cylinder is a source of several disadvantages.

The greater the amount of hose which must be used in association with the cylinder, the greater is the cost of both the initial installation and maintenance. The likelihood of a rupture, wearing, and other forms of breakdown is increased in proportion to the amount of high pressure hose which must be used. In addition, large amounts of such hose add weight to the associated structure, increase the possibility of leakage at couplings, and may require considerable provisions for preventing entanglement and kinking.

The present invention alleviates the foregoing problems by providing a cylinder control unit with which but a single hose need be used between the operator's position and the cylinder itself. Thus the costs and maintenance problems associated with the use of pneumatic cylinders are considerably reduced, and the operation thereof is enhanced, particularly where the operator is situated at a distance from the cylinder. The invention accomplishes control of a two way cylinder with a single hose by utilizing a variation in the air pressure supplied to the hose to switch the air flow between ends of the cylinder.

Specifically, the invention provides a control unit disposed in proximity to the cylinder which unit has an air inlet connected to the operator's valve through the described single hose and which has two outlets, one connected with either end of the cylinder. A spring-loaded element is provided within the control unit which element occupies a first position when the air pressure from the supply is less than a selected value and which moves to a second position when the supply pressure is raised above such value. Such movement is arranged to switch the air flow from one end of the pneumatic cylinder to the other and means are provided for venting the end of the cylinder which is not receiving the air flow in either position. The operator's valve is of a type capable of supplying either of two pressures to the control unit so that extension or contraction of the pneumatic cylinder is readily effected by a simple manipulation of such valve.

It is accordingly an object of this invention to provide a fluid flow controlling valve operable to switch said flow between a plurality of outlets in response to controlled variations in pressure at the inlet to said valve.

It is an object of this invention to provide a control means for operating a double acting fluid pressure driven cylinder from a remote location and by means of a single conduit connecting said cylinder and said remote location.

It is a further object of this invention to minimize the amount of high pressure conduit required for the operation of pneumatic cylinders from remote locations and thereby to reduce maintenance, air leakage and the possibility of breakdowns.

It is an object of the invention to provide for the control of a pneumatic cylinder whereby the motion thereof may be reversed by varying the air pressure supplied thereto about a selected and adjustable value.

It is still another object of this invention to provide a pneumatic mechanism for operating the hinged bottom gate on the bucket of a power shovel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 3 is a second exploded perspective view of the control unit shown in FIGURE 2 and with the mechanism in position to supply compressed air to the second end of the cylinder.

FIGURE 4 is a broken out perspective view of a modified form of compressed air flow control unit suitable for use with the pneumatic cylinder of FIGURE 1.

FIGURE 5 is a perspective view of the dipper stick and bucket of a power shovel illustrating the application of the invention thereto for purposes of operating the hinged gate at the bottom of the bucket.

Figure 1:
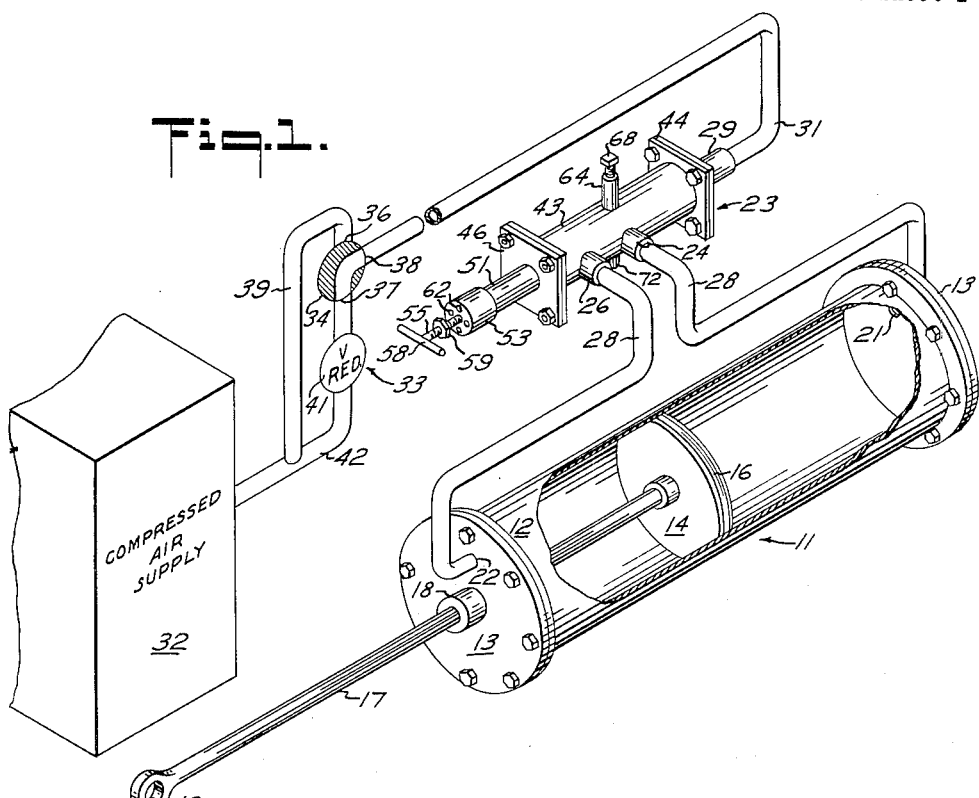
FIGURE 1 is a perspective view showing a double acting pneumatic cylinder and novel means for controlling the operation thereof, certain portions of the apparatus being shown in schematic form.

Referring now to the drawing and more particularly to FIGURE 1 thereof, there is shown a double acting pneumatic cylinder 11 of conventional design, the assembly comprising a long cylindrical casing 12 each end of which is closed by a circular plate 13. Disposed within casing 12 is a circular piston 14 which piston has a diameter similar to the interior diameter of the casing and which is adapted to slide therein, an annular seal 16 being mounted in a peripheral groove on the piston to reduce air leakage between ends of the cylinder. To transmit reciprocatory motion of the piston 14 to a load, a shaft 17 projects in an axial direction from one side of the piston, such shaft extending through a seal 18 at the center of an end plate 13 and being terminated in an annulus 19 to facilitate coupling to the load.

Control of the motion of the cylinder 11, and more specifically control of the outward and inward motion of the shaft 17 with respect to the casing 14, is accomplished by selectively admitting compressed air to one of two inlets to the cylinder, a first such inlet 21 being situated in a first of the end plates 13 and the second inlet 22 being situated in the opposite end plate. To accomplish the switching of a compressed air flow between the two inlets 21 and 22 by manual control from a remote location, a control unit or valve 23 is provided in proximity to the cylinder 11, the control unit having two air outlets 24 and 26 communicating through short hoses 27 and 28 respectively with the cylinder air inlets 21 and 22 respectively. Control unit 23 has a single compressed air inlet 29 communicating through a long hose 31 with a remotely situated compressed air supply 22 through an operator's valve assembly 33.

As will hereinafter be discussed in more detail, control unit 23 acts to switch the air flow entering inlet 29 to either outlet 24 or 26 in accordance with the level of pressure supplied to the inlet. Thus to manually control the cylinder 11, it is necessary that the operator's valve 33 be capable of admitting either of two substantially different pressures to the hose 31. While various means for accomplishing the foregoing will suggest themselves to those skilled in the art, an advantageous construction for the operator's valve 33 is shown schematically in FIGURE 1. Such means comprises a manually operable valve 34 having a first and second intake 36 and 37 respectively either of which intakes may be communicated with an outlet 38, to which hose 31 connects, by appropriate manipulation of the valve. It is desirable also that the valve 34 have a closed position. The first intake 36 of the valve 34 connects directly with the compressed air supply 32 through a conduit 39 so that full pressure may be transmitted to the hose 31. The second intake 37 of the manually operated valve 34 communicates with the compressed air supply 32 through a pressure reduction valve 41 and conduit 42 so that in the second position of valve 34 a substantially reduced pressure is transmitted to the hose 31.

Figure 2:
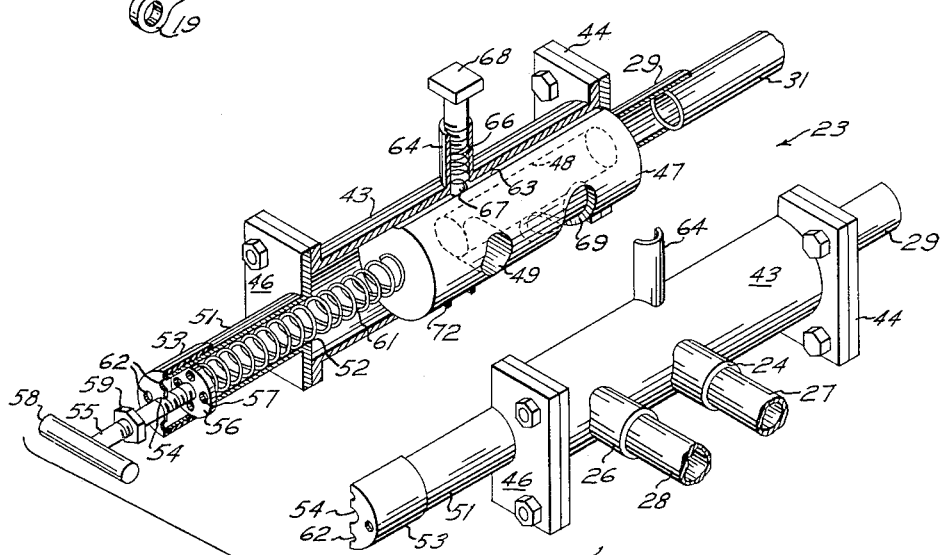
FIGURE 2 is an exploded perspective view showing the internal structure of the control unit associated with the pneumatic cylinder of FIGURE 1 with the mechanism in position to supply compressed air to a first end of the cylinder.

Referring now to FIGURE 2, the detailed construction of the control unit 23 is shown, such unit comprising a cylindrical casing 43 having flanged extremities to which rectangular end plates 44 and 46 are secured. Hose 31 from the compressed air supply and operator's valve enters inlet fitting 29 at the center of end plate 44 and outlet fittings 24 and 26 are situated in the lateral wall of the casing, with a spacing which will be hereinafter discussed.

Disposed within the casing 43 is a slidable solid piston 47 which piston has a length less than the length of the casing by an amount equal to the spacing of the outlet fittings 24 and 26. The piston 47 has an internal passage 48 which passage extends from the center of the end of the piston nearest compressed air inlet 29 to an opening 49 in the lateral wall of the piston which opening is situated to communicate with casing air outlet 24 when the piston is abutted against endplate 44. Thus with the piston 47 in the indicated position, the compressed air flow from inlet 29 is transmitted through the piston to air outlet 24 and to one end of the pneumatic cylinder.

To provide a force urging the piston 47 into abutment with endplate 44 a tubular spring housing 51 is secured to the opposite end plate 46, the housing projecting outward from the endplate in coaxial relationship with casing 43 and being communicated therewith through an opening 52 in the center of the endplate. A threaded cap 53 closes the extremity of spring housing 51 which cap has a central threaded passage 54 in which a threaded rod 55 is engaged. At the end of rod 55 within the housing 51 is a disk shaped spring stop 56 is mounted, the stop being mounted coaxially on the rod and being provided with a plurality of air passages 57. To provide for adjustment of the longitudinal position of the stop 56 within the housing 51, a transverse handle 58 is provided on the projecting end of the rod 55 and a lock nut 59 is mounted thereon to secure the stop at a selected position. A compression spring 61 is disposed within the housing 51, one end of the spring being abutted against the stop 56 and the opposite end of the spring being extended within the casing 43 and abutted against the end of piston 47. Spring 61 thus acts to force the piston 47 against endplate 44 and thus to channel air entering inlet 29 to outlet 24 in the manner hereinbefore described. It will be found, however, that if the pressure at inlet 29 exceeds the force of the spring 61, the piston will move to the opposite end of the casing and, as will be described, a switching of the air flow to the second outlet 26 will occur. Adjustment of the exact pressure at which this transition occurs is made by turning the handle 58 thereby varying the tension of the spring.

Considering further the action of the unit 23 while the piston 47 is in the first position, that in which the piston abuts endplate 44, it will be noted that for proper operation of a pneumatic cylinder, the end of the cylinder which is not receiving the air flow must be vented to the atmosphere. To vent the second air outlet 26 when the piston 47 is in the described position, passages 62 are provided in the spring housing cap 53 so that venting is provided for through such passages in conjunction with the passages 57 in stop 56 and the portion of casing 43 which is not occupied by the piston 47.

To restrain the piston 47 from rotating within the casing 43, a longitudinal groove is in register with an internally threaded tubulation 64 projecting from the wall of casing 43. A compression spring 66 is disposed within the tubulation 64 which spring forces a steel sphere 67 partially into the groove 63, the outer end of the spring being abutted against the end of a threaded bolt 68 which bolt is engaged in the end of the tubulation.

Referring now to FIGURE 3, the control unit 23 is shown with the piston 47 moved into contact with the second endplate 46, such condition having been brought about by an increase in the pressure supplied inlet 29 to overcome the force of the spring 61. Provided the piston 47 and casing 43 are properly proportioned, such movement of the piston brings the lateral opening 49 thereof into register with the second air outlet 26 in the casing wall thereby reversing the air flow between ends of the pneumatic cylinder and reversing the movement thereof.

It will be found, however, that with the piston 47 in the above described second position, provision for the venting of the first air outlet 24 must be provided. Accordingly a circumferentially directed groove 69 is formed in the lateral wall of piston 47 which groove originates at a point 71 spaced towards air inlet 29 from opening 49 a distance equal to the spacing between the two air outlets 24 and 26. The groove 69 extends around the piston 47 for substantially one fourth of the circumference thereof. A vent tubulation 72 is provided on the casing 43 at a longitudinal position thereon corresponding to that of the first air outlet 24, the tubulation being spaced from the outlet 24 in the circumferential direction by an amount equal to the length of the groove 69 on piston 47. Thus with the piston 47 in the second position, air outlet 24 is vented to the atmosphere through the groove 69 and tubulation 72.

Referring now to FIGURE 4, a modified form of the control unit is shown which modified form may be constructed largely from standard metal stocks and forms. A tubular casing 73 is provided which casing is open and internally threaded at a first end 74. A compressed air inlet 76 enters the center of the second end 77 of the casing 73 and two air outlets 78 and 79 are provided in the lateral wall thereof for connection with the pneumatic cylinder. A vent tubulation 81 is provided in the wall of casing 73 at a longitudinal position thereon corresponding to that of air outlet 78 and removed therefrom in the circumferential direction a distance equal to one quarter of the circumference of the casing. A slidable piston 82, similar to the piston 47 of the embodiment of FIGURE 2 except for the absence of a longitudinal groove, is disposed within the casing 73 and is provided with internal passages and grooves similar to those described in conjunction with the piston 47 of FIGURE 3. The spacing of the air outlets 78 and 79 with reference to the proportions of the piston 82 and the configuration of internal passages and grooves on the piston are all similar to that described in conjunction with FIGURE 2 and the action of the apparatus in switching air flow between outlets 78 and 79 in response to variations in pressure supplied inlet 76 is identical to that previously described.

Considering now the modified mechanisms for limiting travel of the piston 82 within the casing and for exerting a force on the piston in the direction of air inlet 76, an externally threaded cylindrical cap 83 is inserted in the open end 74 of casing 73 and engaged with the threads thereof, a set screw 84 being engaged in a threaded aperture in the casing wall to bear against the surface of the cap and to lock the cap in any selected longitudinal position with respect to the casing. A disk-shaped spring stop 86 is disposed within end 74 of casing 73, the stop having a rectangular center aperture 87 and having a radially projecting extension 88 at two opposite points on the circumference thereo. Extensions 88 are entered in two slots 89 which slots are cut into end 74 of casing 73 at opposite points on the circumference thereof and which are directed longitudinally with respect to the casing. Stop 86 is thus mounted coaxially within the casing 73 and may undergo a limited longitudinal movement therein.

A compression spring 91 is disposed within the casing 73 between stop 86 and the piston 82, the spring acting to force the piston in the direction of air inlet 76. It will be found that the tension of the spring 91, and thus the pressure level at which switching of the air flow occurs, may be adjusted by rotating the cap 83 to move the stop 86.

To prevent rotation of the piston 82, a shaft 92 of rectangular cross section is secured to the end of the piston at the center thereof and extends along the axis of spring 91 and through the rectangular aperture 87 in stop 86. To limit movement of the piston 82 within the casing 73 to that necessary to accomplish switching of the air flow, specifically to a distance equal to the spacing of air outlets 78 and 79, a hollow cylindrical sleeve 93 of appropriate length is mounted on the shaft 92, the shaft being transpierced through rectangular apertures 94 in the endwalls of the sleeve. If desired, provision for lubricating the piston 82 may be provided such provision being, for example, a tubulation 96 on the exterior wall of the casing which communicates with the interior thereof through a minute aperture 97 in the casing wall. The tubulation may be filled with lubricant and closed by a threaded plug 98 engaged with internal threads in the end of the tubulation. A vent opening 99 is provided in the wall of casing 73, in the region of spring 91, to provide for the venting of air outlet 79 when the piston 82 is adjacent the air inlet 76.

Referring now to FIGURE 5, the installation of the apparatus of FIGURES 1, 2, and 3, on a power shovel for purposes of operating the hinged gate at the bottom of the bucket thereof is illustrated. The bucket 101 is generally of rectangular form and the bottom thereof is provided with a hinged gate 102 the rear edge of which is connected by a pair of spaced apart legs 103 with pivot bearing 104 on the rear face of the bucket. To support the bucket, an arm or dipper stick 106 is used which arm extends rearwardly from a central position on the rear wall of the bucket. The arm 106 in this embodiment is a channel member of U-shaped cross section with the open side uppermost and with a portion of the bottom plate cut away to form a rectangular opening 107 in the region adjacent bucket 101.

The pneumatic cylinder 11 is provided with a rearwardly projecting vertical plate 108 at the end opposite from the reciprocating shaft 17 which plate is transpierced by a pivot shaft 109 extending between side members of the arm 106. To hold the plate 108 at a central position on the pivot shaft 109 a pair of annular collars 111 are secured thereon one on each side of the plate. Cylinder 11 extends forwardly and downwardly from pivot shaft 109 through the opening 107 in arm 106. The annulus 19 at the end of the cylinder shaft 17 is transpierced by a second pivot shaft 112 which extends between the legs 103 at the rear of the hinged gate 102, a pair of collars 113 being secured on the shaft to hold annulus 19 at a central position thereon.

Thus a retraction of shaft 17 into the cylinder 11 will open the gate 102 and an extension of the shaft will close the same. To control the cylinder, control unit 23 is mounted on the cross member of arm 106 to the rear of the cylinder. Control unit outlet hoses 27 and 28 are connected to opposite ends of the cylinder and the air inlet hose 31 extends backward along the dipper stick to the operators cab. The described power drive of the gate 102 is highly advantageous and the use of a single hose 31 to connect the mechanism with the operators cab permits the system to be installed and utilized with minimum difficulty and with maximum efficiency.

What is claimed is:

1. In a valve for connecting a supply of high pressure fluid with any selected one of a plurality of fluid channels, the combination comprising a housing having a fluid inlet connectable with said supply of high pressure fluid and having a plurality of fluid outlets each connectable with a separate one of said plurality of fluid channels, a spring loaded element disposed within said housing in the path of fluid entering said inlet thereto, said element being movable to a plurality of positions within said housing by progressively greater fluid pressures at said inlet and connecting said inlet with a separate one of said outlets at each of said positions, and means for controllably varying the fluid pressure transmitted to said inlet from said supply whereby fluid may be directed to a selected one of said channels.

2. In a valve for connecting a source of high pressure fluid with any selected one of a plurality of fluid outlets, the combination comprising a valve housing forming a cylindrical chamber and having a fluid inlet opening at a first end thereof which opening is connectable with said source of high pressure fluid, said housing having a plurality of outlet openings spaced at differing longitudinal positions along the wall thereof, a slidable cylindrical piston disposed within said chamber which piston has an internal passage communicating between the end thereof closest to said inlet opening and a point on the lateral wall thereof which point sequentially traverses said outlet openings as said piston is moved within said chamber, and a resilient element bearing against said piston and exerting a force thereon in the direction of said inlet opening whereby selected fluid pressures applied to said inlet force said piston to selected longitudinal positions within said chamber thereby connecting said inlet with any selected one of said outlets.

3. A valve substantially as described in claim 2 and wherein said housing is provided with a vent and wherein said piston is further characterized by a second passage which second passage extends between said vent and a second point on the wall of piston which second point traverses said outlet openings as said piston is moved within said housing.

4. A valve substantially as described in claim 2 and comprising the further combination of means for adjustably varying the force exerted by said resilient element on said piston.

5. A valve for directing a high pressure fluid flow to a selected one of two conduits comprising, in combination, a valve body having a cylindrical chamber formed therein, said chamber having a fluid inlet at one end and having two spaced outlet openings in the lateral wall, said chamber further having a vent, a piston slideably disposed in said chamber and having a first fluid passage connecting the end of the piston nearest said inlet with a first area at the side of said piston which area may be moved into register with either of said outlet openings of said chamber by movement of said piston therein, said piston having a second fluid passage extending between said vent and a second area at the side of said piston which second area is spaced from said first area a distance equal to the spacing of outlet openings in said chamber, means limiting motion of said piston in said chamber to a distance equal to the spacing of outlet openings therein, and a spring exerting a force on said piston in the direction of said inlet whereby a fluid pressure at said inlet greater than the force of said spring causes said piston to move in said chamber and transfers said fluid flow from a first to the second of said outlet openings.

6. A control unit for operating a pneumatic drive cylinder of the type having two air inlets for effecting motion of a shaft in either of two opposed directions, said control unit comprising a housing having a cylindrical chamber therein which chamber has an inlet at a first end connected with a source of high pressure air, said housing having a vent and having a first and a second air outlet spaced at progressively greater distances from said inlet, each of said air outlets being connected to a separate one of said air inlets of said pneumatic drive cylinder, a slidable piston disposed within said housing, said piston being movable between a first and a second position within said housing which positions are separated a distance equal to the spacing of said first and second air outlets, said piston having a first air passage connecting the end thereof nearest said inlet with a first area on the side of the piston which first area is in register with said first outlet when said piston is at said first position and which is in register with said second outlet when said piston is at said second position, said piston being further provided with a second air passage connecting said vent with a second area on the side of the piston which second area is in register with said first outlet when said piston is in said second position, a spring disposed within said housing and exerting a force on said piston in the direction of said air inlet, and means for altering the air pressure transmitted to said inlet from said source of high pressure air from a first to a second value, one of said values exerting a force on said piston less than that of said spring thereon and the other of said values exerting a force on said piston greater than that of said spring thereon.

7. A control unit for operating a pneumatic drive cylinder substantially as described in claim 6 and comprising the further combination of a movable stop element bearing against the end of said spring most distant from said piston and a threaded element engaged with said housing and controlling the position of said stop whereby the tension of said spring may be adjusted to vary the inlet pressure needed to move said piston within said housing.

8. A control unit for operating a pneumatic drive cylinder substantially as described in claim 6 wherein said means for altering the air pressure transmitted to said inlet from said source of high pressure air comprises a manually operable valve situated remotely from said housing and having a single outlet connected with said air inlet of said housing by a single high pressure hose, said manually operable valve having an inlet connected with said source and having a first setting supplying said first pressure value to said hose and having a second setting supplying said second pressure value to said hose.

9. A control unit for operating a pneumatic drive cylinder substantially as described in claim 6 wherein said chamber has an axial length just equal to the sum of the length of said piston and the separation between said first and second positions thereof and wherein said piston is provided with a longitudinal groove along the surface thereof and said housing carries an element projecting into said groove of said piston whereby rotary motion thereof is prevented.

10. A control unit for operating a pneumatic drive cylinder substantially as described in claim 6 wherein an adjustable stop is provided against the end of said spring most distant from said piston which stop is provided with a rectangular aperture at the center thereof and comprising the further combination of a rod of rectangular cross section extending from said piston along the axis thereof and extending through said rectangular aperture of said stop for preventing rotary motion of said piston, said control unit further comprising a cylindrical sleeve disposed coaxially within said housing and limiting motion of said piston to the separation of said first and second positions thereof.

11. In a valve for supplying high pressure fluid to a selected one of a plurality of fluid channels, the combination comprising a housing having an inlet and having a plurality of outlets each connectable with a successive one of said plurality of fluid channels, means for supplying high pressure fluid to said inlet of said housing and for controllably adjusting the pressure of said fluid at said inlet to a selected one of a plurality of fixed pressure levels, and an element disposed within said housing and having a plurality of positions each communicating said inlet with a successive one of said plurality of outlets, said element being movable between said positions in response to changes in the fluid pressure level supplied said inlet.

References Cited in the file of this patent
UNITED STATES PATENTS

| | | |
|---|---|---|
| 889,202 | Clifford | June 2, 1908 |
| 1,287,165 | Wood | Dec. 10, 1918 |
| 2,468,960 | Case | May 3, 1949 |